United States Patent
Chen et al.

(10) Patent No.: US 12,484,825 B2
(45) Date of Patent: Dec. 2, 2025

(54) STRETCH-DEFORMING ELECTRODE AND BIOLOGICAL SENSING SYSTEM

(71) Applicant: Pine Castle Investments Limited, Tortola (VG)

(72) Inventors: Kuan-Jung Chen, New Taipei (TW); Yu-Cheng Liu, New Taipei (TW)

(73) Assignee: Pine Castle Investments Limited Tortola (VG)

( * ) Notice: Subject to any disclaimer, the term of this patent is extended or adjusted under 35 U.S.C. 154(b) by 815 days.

(21) Appl. No.: 17/695,971

(22) Filed: Mar. 16, 2022

(65) Prior Publication Data

US 2022/0386920 A1    Dec. 8, 2022

(30) Foreign Application Priority Data

Jun. 8, 2021 (CN) .......................... 202110638543.6

(51) Int. Cl.
*A61B 5/263* (2021.01)

(52) U.S. Cl.
CPC ........ *A61B 5/263* (2021.01); *A61B 2562/164* (2013.01)

(58) Field of Classification Search
None
See application file for complete search history.

(56) References Cited

U.S. PATENT DOCUMENTS

| | | | |
|---|---|---|---|
| 2017/0172439 A1* | 6/2017 | Zhu | B32B 15/14 |
| 2018/0184735 A1* | 7/2018 | Longinotti-Buitoni | A61B 5/282 |
| 2019/0132948 A1* | 5/2019 | Longinotti-Buitoni | A61B 5/6805 |
| 2022/0117503 A1* | 4/2022 | Wang | A61B 5/14521 |

FOREIGN PATENT DOCUMENTS

| | | | | |
|---|---|---|---|---|
| CN | 106336670 A | | 1/2017 | |
| CN | 107576258 A | | 1/2018 | |
| CN | 108385257 A | | 8/2018 | |
| CN | 112675318 A | * | 4/2021 | |
| RU | 2690972 C1 | | 6/2019 | |
| WO | WO-0170330 A2 | * | 9/2001 | ......... A61B 10/0045 |

OTHER PUBLICATIONS

English machine translation of CN 112675318 A, 2025 Clarivate Analytics, 8 pages, printed on Mar. 28, 2025 (Year: 2025).*
First Office Action cited in CN202110638543.6, mailed Sep. 18, 2025, 16 pages.

* cited by examiner

*Primary Examiner* — Matthew Kremer
(74) *Attorney, Agent, or Firm* — Cooper Legal Group, LLC

(57) ABSTRACT

A stretch-deforming electrode includes a stretching portion. The stretching portion has a first stretching range and a second stretching range, in which the stretching portion has a first length variation and a first resistance variation in the first stretching range and a second length variation and a second resistance variation in the second stretching range. The first resistance variation remains substantially unchanged when the first length variation changes, the second resistance variation changes when the second length variation changes. The second resistance variation is represented by R2, the second length variation is represented by L2, and R2=A×L2, in which A is a positive number between 0.05 and 2.

20 Claims, 14 Drawing Sheets

STRETCH-DEFORMING ELECTRODE AND BIOLOGICAL SENSING SYSTEM

RELATED APPLICATIONS

The present disclosure claims priority to Chinese Patent Application 202110638543.6, filed on Jun. 8, 2021, which is incorporated herein by reference.

BACKGROUND

Field of Disclosure

The present disclosure relates to a stretch-deforming electrode and a biological sensing system including the stretch-deforming electrode.

Description of Related Art

With the development of science and technology, many physiological sensing devices on the market are gradually evolving towards a thin, short, and wearable form. However, a sensing electrode in a wearable physiological sensing device is often unable to withstand the large stretching deformation caused by limb movements of a user and is prone to local cracks or whole fracture during use, thus noise and signal interrupts are generated, resulting in the inability of the physiological sensing device to accurately collect physiological signals measured by the sensing electrode. Therefore, how to provide a sensing electrode that can be well and stably applied to a wearable physiological sensing device is a direction worthy of research in this field.

SUMMARY

According to some embodiments of the present disclosure, a stretch-deforming electrode includes a stretching portion. The stretching portion has a first stretching range and a second stretching range, and the stretching portion has a first length variation and a first resistance variation in the first stretching range and a second length variation and a second resistance variation in the second stretching range. The first resistance variation remains substantially unchanged when the first length variation changes, the second resistance variation changes when the second length variation changes. The second resistance variation is represented by R2, the second length variation is represented by L2, and R2=A×L2, in which A is a positive number between 0.05 and 2.

In some embodiments of the present disclosure, a stretching resistance recovery rate of the stretching portion is between 95% and 100%.

In some embodiments of the present disclosure, a number of stretching recovery times of the stretching portion is between 1 and 3000 times.

In some embodiments of the present disclosure, a coefficient of determination ($R^2$) of the equation represented by R2=A×L2 is between 0.95 and 1.00.

In some embodiments of the present disclosure, the first length variation is between 0% and 250%, and the second length variation is between 250% and 450%.

In some embodiments of the present disclosure, a ratio of a range of the first length variation to a range of the second length variation is greater than or equal to 1.25.

In some embodiments of the present disclosure, the stretching portion includes a plurality of conductive particle structures, and an average particle size of the conductive particle structures is between 0.5 nm and 100 μm.

In some embodiments of the present disclosure, the stretching portion includes a plurality of conductive wire structures, an average wire diameter of the conductive wire structures is between 0.5 nm and 1 μm, and an average wire length of the conductive wire structures is between 50 nm and 1000 μm.

According to some other embodiments of the present disclosure, a biological sensing system includes a transmitter, a receiver, a controller, and a corrector. The transmitter includes a working electrode layer, and the working electrode layer includes the above-mentioned stretch-deforming electrode. The receiver is electrically connected to the transmitter, and is configured to receive a substance to be measured and transmit a first signal value generated by the substance to be measured to the transmitter, such that the transmitter outputs the first signal value and a second signal value. The controller is electrically connected to the transmitter, and is configured to receive the first signal value and the second signal value and determine whether the second signal value falls within the second stretching range of the stretching portion. The corrector is electrically connected to the controller, in which when the second signal value falls within the second stretching range of the stretching portion, the corrector is configured to correct the first signal value to calculate a parameter to be measured of the substance to be measured.

In some embodiments of the present disclosure, when the second signal value does not fall within the second stretching range of the stretching portion, the corrector does not perform a correction function.

In some embodiments of the present disclosure, the first signal value includes a current value, and the second signal value includes a resistance value.

In some embodiments of the present disclosure, the stretching portion extends from a first endpoint to a second endpoint, in which when the current value is between 0.0001 μA and 1000 μA, a stretching length variation of the stretching portion is less than 450%, and when a potential difference between the first endpoint and the second endpoint is between −1 V and 1 V, an area of the stretching portion in a cyclic voltammogram is between 0.00015 μA×V and 1500 μA×V.

In some embodiments of the present disclosure, the stretching portion extends from a first endpoint to a second endpoint, in which when the current value is between 0.0001 μA and 835 μA, a stretching length variation of the stretching portion is less than 450%, and when a potential difference between the first endpoint and the second endpoint is between −1 V and 1 V, an area of the stretching portion in a square wave voltammogram is between 0.00015 μA×V and 1245 μA×V.

In some embodiments of the present disclosure, the stretching portion extends from a first endpoint to a second endpoint, in which when the current value is between 0.0001 μA and 795 μA, a stretching length variation of the stretching portion is less than 450%, and when a potential difference between the first endpoint and the second endpoint is between −1 V and 1 V, an area of the stretching portion in a differential pulse voltammogram is between 0.00015 μA×V and 1195 μA×V.

In some embodiments of the present disclosure, the receiver includes a signal transmission layer, a signal generation layer, and a signal enhancement layer. The signal transmission layer is connected to the working electrode layer and configured to transmit the first signal value to the working electrode layer. The signal generation layer is configured to receive the substance to be measured. The signal enhancement layer is sandwiched between the signal transmission layer and the signal generation layer.

In some embodiments of the present disclosure, an oxidation potential of the signal transmission layer is higher than an oxidation potential of the signal enhancement layer.

In some embodiments of the present disclosure, the working electrode layer has a first surface and a second surface facing away from the first surface, and the biological sensing system further includes a substrate and a waterproof layer. The substrate is disposed on the first surface of the working electrode layer. The waterproof layer is disposed on the second surface of the working electrode layer in which the waterproof layer has a through hole, and the receiver is exposed by the through hole.

In some embodiments of the present disclosure, the working electrode layer has a first side and a second side facing away from the first side, and the transmitter further includes a counter electrode layer and a reference electrode layer. The counter electrode layer is disposed on the first side of the working electrode layer and includes the above-mentioned stretch-deforming electrode. The reference electrode layer is disposed on the second side of the working electrode layer and includes the above-mentioned stretch-deforming electrode.

According to the aforementioned embodiments of the present disclosure, the stretch-deforming electrode of the present disclosure has the ability to withstand large stretching deformation, and therefore the stretch-deforming electrode can be well applied to a wearable biological sensing system without local cracks or whole fracture resulting from limb movements of a user. In addition, when a stretching deformation amount (e.g., a length variation) of the stretch-deforming electrode exceeds a certain value, the resistance of the stretch-deforming electrode starts to change, resulting in a decrease in an output signal value. In this case, the biological sensing system can further perform the correction function through the corrector in the biological sensing system to calculate an actual signal value (e.g., the first signal value) and then calculate the parameter to be measured of the substance to be measured in the body of the user. In other words, by means of the combination of the stretch-deforming electrode and the corrector, the biological sensing system of the present disclosure can be applied more widely than conventional physiological sensing devices.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
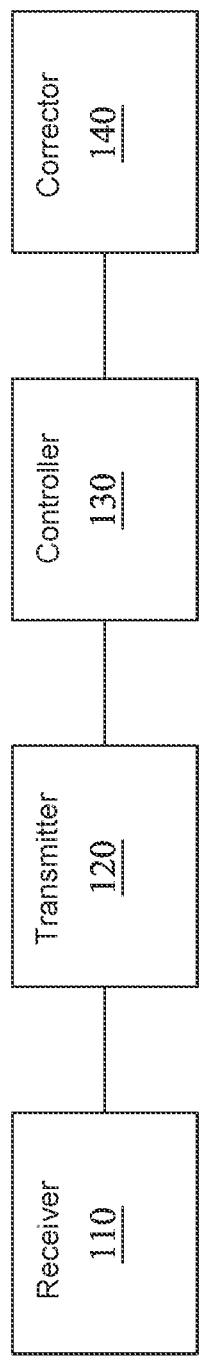
FIG. 1 is a block diagram of a biological sensing system according to some embodiments of the present disclosure.

Drawings are used below to disclose a plurality of embodiments of the present disclosure. For the sake of clear illustration, many practical details are explained together in the description below. However, it should be understood that the practical details should not be used to limit the present disclosure. In other words, in some embodiments of the present disclosure, the practical details are not essential and therefore should not be used to limit the present disclosure. Moreover, for the sake of drawing simplification, some well-known and conventional structures and elements are shown in a simple and schematic manner in the drawings. In addition, for the convenience of readers, the size of each element in the drawings is not drawn according to the actual scale.

It should be understood that relative terms such as "lower" or "bottom" and "upper" or "top" may be used herein to describe one element's relationship to another element, as shown in the drawings. It should be understood that relative terms are intended to encompass different orientations of a device in addition to the orientations depicted in the drawings. By way of example, if a device in the drawings is turned over, elements described as being on the "lower" sides of other elements will then be oriented on the "upper" sides of other elements. Therefore, exemplary term "lower" may encompass both orientations of "lower" and "upper", depending on the particular orientation of the drawings. Similarly, if a device in one of the drawings is turned over, elements described as "below" or "beneath" other elements will then be oriented "above" other elements. The exemplary terms "below" or "beneath" may, therefore, encompass orientations of "above" and "beneath".

The present disclosure provides a stretch-deforming electrode and a biological sensing system including the stretch-deforming electrode. The stretch-deforming electrode of the present disclosure has the ability to withstand large stretching deformation, and therefore the stretch-deforming electrode can be well applied to a wearable biological sensing system without local cracks or whole fracture resulting from limb movements of a user. On the other hand, when a stretching deformation amount (e.g., a length variation) of the stretch-deforming electrode exceeds a certain value, the resistance of the stretch-deforming electrode starts to change, resulting in a decrease in an output signal value. In this case, the biological sensing system can further perform a correction function through a corrector in the biological sensing system to calculate an actual signal value and then calculate a parameter to be measured (e.g., a concentration) of a substance to be measured (e.g., glucose) in the body of the user. In other words, by means of the combination of the stretch-deforming electrode and the corrector, the biological sensing system of the present disclosure can be applied more widely than conventional physiological sensing devices.

FIG. 1 is a block diagram of a biological sensing system 100 according to some embodiments of the present disclosure. The biological sensing system 100 of the present disclosure may be a wearable biological sensing system 100, which may be, for example, a biological sensing patch that can be disposed on a body of a user. The biological sensing system 100 includes a receiver 110, a transmitter 120, a controller 130, and a corrector 140. In some embodiments, the controller 130 and/or corrector can be implemented by a processor and memory configured to store instructions that, when executed by the processor, perform operations as described below. The transmitter 120 is electrically connected to the receiver 110, the controller 130 is electrically connected to the transmitter 120, and the corrector 140 is electrically connected to the controller 130. The receiver 110 is configured to contact the body of the user, so as to receive a substance to be measured in the body of the user and transmit a signal value generated by the substance to be measured to the transmitter 120. The transmitter 120 is configured to transmit the signal value from the receiver 110 to the controller 130, such that the controller 130 further determines whether the signal value needs to be corrected. If it is determined that the signal value does not need to be corrected, the controller 130 can calculate a parameter to be measured of the substance to be measured through the signal value. If it is determined that the signal value needs to be corrected, the corrector 140 is configured to correct the signal value, and then the controller 130 calculates a parameter to be measured of the substance to be measured through the corrected signal value. Specific details about the operation of the biological sensing system 100 are further described below.

Figure 2:
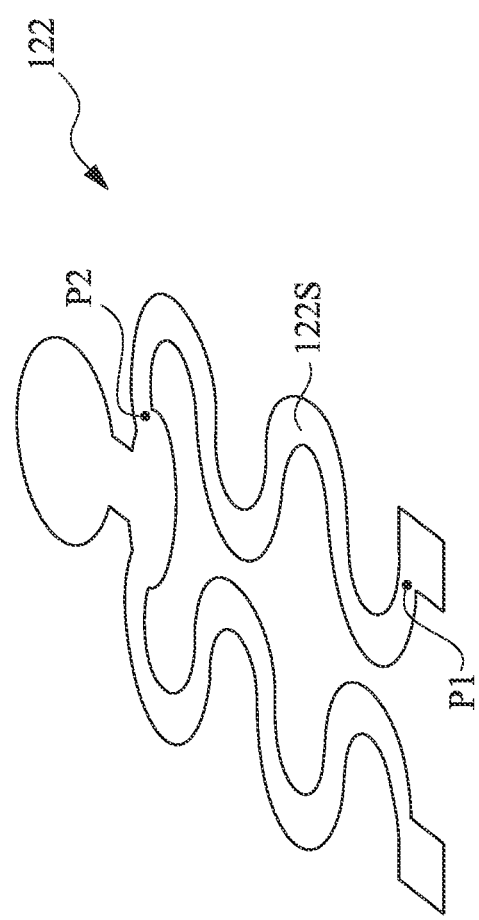
FIG. 2 is a schematic perspective view of a working electrode layer of the transmitter in FIG. 1.

FIG. 2 is a schematic perspective view of a working electrode layer 122A of the transmitter 120 in FIG. 1. The transmitter 120 of the present disclosure may include the working electrode layer 122A. The working electrode layer 122A may include a stretch-deforming electrode 122. The stretch-deforming electrode 122 may have the ability to withstand large stretching deformation, so as to be stably applied to the wearable biological sensing system 100. In some embodiments, the stretch-deforming electrode 122 has a stretching portion 122S extending from a first endpoint P1 to a second endpoint P2, and the stretching portion 122S can generate stretching deformation in response to external stress (e.g., an external force generated by a movement of the user). In the following description, the stretching portion 122S of the stretch-deforming electrode 122 in FIG. 2 is described in detail through the description of FIG. 3 and FIG. 4.

Figure 3:
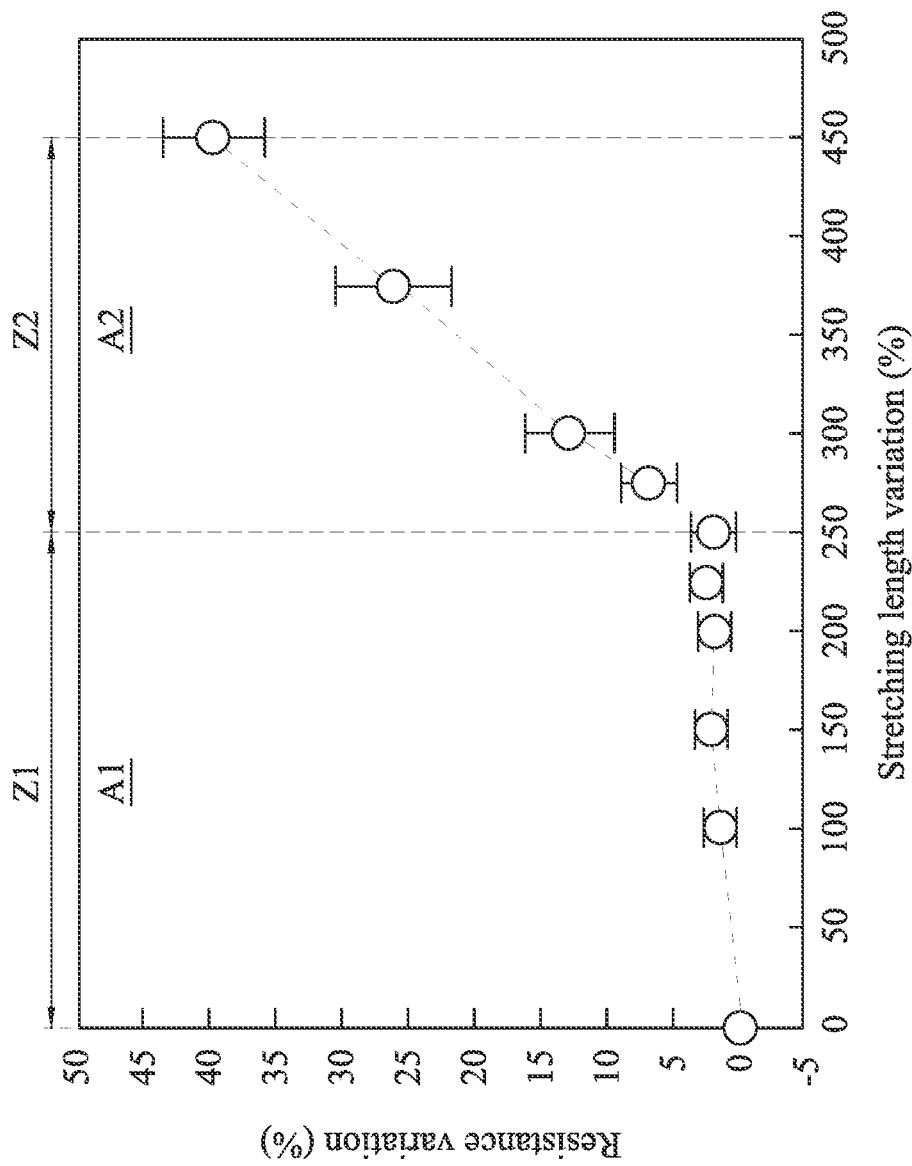
FIG. 3 is a diagram showing the relationship between a resistance variation and a stretching length variation of the stretching portion of the stretch-deforming electrode in FIG. 2.

FIG. 3 is a diagram showing the relationship between a resistance variation and a stretching length variation of the stretching portion 122S of the stretch-deforming electrode 122 in FIG. 2. More specifically, FIG. 3 shows the relationship between a resistance variation and a stretching length variation when the stretching portion 122S of the stretch-deforming electrode 122 is stretched and deformed under an external force. Reference is made to FIG. 2 and FIG. 3. The stretching portion 122S of the stretch-deforming electrode 122 has a first stretching range A1 and a second stretching range A2 in the diagram showing the relationship between the resistance variation and the stretching length variation. In the first stretching range A1, the stretching portion 122S has a first length variation L1 (i.e., a horizontal axis coordinate position of any point on a curve in the first stretching range A1) and a first resistance variation R1 (i.e., a vertical axis coordinate position of any point on the curve in the first stretching range A1). In the second stretching range A2, the stretching portion 122S has a second length variation L2 (i.e., a horizontal axis coordinate position of any point on a curve in the second stretching range A2) and a second resistance variation R2 (i.e., a vertical axis coordinate position of any point on the curve in the second stretching range A2). It should be particularly noted that, the "length variation" herein is defined as "a ratio (expressed as a percentage) of a length $L_f$ of the stretching portion 122S after stretching to a length $L_i$ before stretching (i.e., the original length $L_i$)"; and the "resistance variation" herein is defined as "a ratio (expressed as a percentage) of a value $\Delta R$ obtained by subtracting a resistance $R_i$ of the stretching portion 122S before stretching from a resistance $R_f$ after stretching, to the resistance $R_i$ before stretching".

In some embodiments, the first resistance variation R1 remains substantially unchanged (i.e., the variation of the first resistance variation R1 with the first length variation L1 is small, which means a measurement deviation range is acceptable, thus no correction is required), and the second resistance variation R2 changes with the second length variation L2. It should be particularly noted that, the "substantially" used herein refers to being within 5%, and preferably within 3% of a given value or range. That is, the aforementioned "the first resistance variation R1 remains substantially unchanged" refers to "the first resistance variation R1 falling within 5%". In detail, since in the first stretching range A1, the resistance variation (i.e., the first resistance variation R1) of the stretching portion 122S does not substantially change with the stretching length variation (i.e., the first length variation L1), when the stretching length variation of the stretching portion 122S falls within the first stretching range A1, the signal value output by the stretch-deforming electrode 122 does not substantially decrease correspondingly, and thus the parameter to be measured of the substance to be measured can be accurately calculated through the signal value, in which the signal value does not need to be further corrected. In contrast, since in the second stretching range A2, the resistance variation (i.e., the second resistance variation R2) of the stretching portion 122S changes with the stretching length variation (i.e., the second length variation L2), when the stretching length variation of the stretching portion 122S falls within the second stretching range A2, the signal value output by the stretch-forming electrode 122 decreases correspondingly, and thus the signal value needs to be further corrected, such that the parameter to be measured of the substance to be measured can be accurately calculated through the corrected signal value. Based on the above, the first stretching range A1 may also be referred to as a "non-correction area A1", and the second stretching range A2 may also be referred to as a "correction area A2". Specific details about the correction performed by the biological sensing system 100 are further described below.

In some embodiments, for the correction area A2, the relationship between the second resistance variation R2 and the second length variation L2 can be represented by formula (1). Formula (1): $R2 = A \times L2$, in which A is a positive number between 0.05 and 2. In other words, in the correction area A2 of FIG. 3, it can be found that any R2 value and L2 value corresponding to the correction area A2 conform to the relationship of the above-mentioned formula (1). Based on the above, the stretching portion 122S of the stretch-deforming electrode 122 may have an appropriate resistance variation when stretching portion 122S is stretched and deformed under an external force, so as to facilitate the application in the biological sensing system 100 that can perform correction and can thus ensure that the resistance variation of the stretching portion 122S does not cause difficulties to correction due to an instantaneous excess. In detail, if A is less than 0.05 in formula (1), there is no difference between the non-correction area A1 and the correction area A2. That is, the stretching portion 122S of the stretch-deforming electrode 122 does not have the correction area A2, resulting in the stretch-deforming electrode 122 not being able to be applied in the biological sensing system 100 that can perform correction. Moreover, if A is greater than 2 in formula (1), when the stretching portion 122S of the stretch-deforming electrode 122 is deformed under an external force, the resistance variation of the stretching portion 122S increases instantaneously, resulting in the difficulties to correction, or even an inability to perform correction. In some preferred embodiments, A is a positive number between 0.0500 and 0.5000 in formula (1), such that the above-mentioned effect is better achieved. On the other hand, a coefficient of determination ($R^2$) of the equation represented by formula (1) may be between 0.95 and 1.00 to ensure that, in the correction area A2, there is a relationship that is sufficiently close to linear between the resistance variation and the stretching length variation of the stretching portion 122S, thereby improving the accuracy and convenience of correction. In some preferred embodiments, the coefficient of determination ($R^2$) of the equation represented by formula (1) may further be between 0.99 and 1.00.

In some embodiments, a ratio of a range Z1 of the stretching length variation (i.e., the first length variation L1) of the stretching portion 122S in the non-correction area A1 to a range Z2 of the stretching length variation (i.e., the second length variation L2) of the stretching portion 122S in the correction area A2 may be greater than or equal to 1.25. In other words, the range Z1 of the stretching length variation of the stretching portion 122S in the non-correction area A1 is relatively large, such that the stretch-deforming electrode 122 can operate under a certain stretching length variation without additional correction. In some embodiments, the range Z1 of the stretching length variation (i.e., the first length variation L1) of the stretching portion 122S in the non-correction area A1 may be between 0% and 250%, and the range Z2 of the stretching length variation (i.e., the second length variation L2) of the stretching portion 122S in the correction area A2 may be between 250% and 450%. In other words, when the stretching length variation of the stretching portion 122S is less than 250%, the biological sensing system 100 can directly calculate the parameter to be measured of the substance to be measured through the signal value output by the stretch-deforming electrode 122; when the stretching length variation of the stretching portion 122S is greater than 250%, the biological sensing system 100 can further correct the signal value output by the stretch-deforming electrode 122, so as to calculate the parameter to be measured of the substance to be measured through the corrected signal value.

Figure 4:
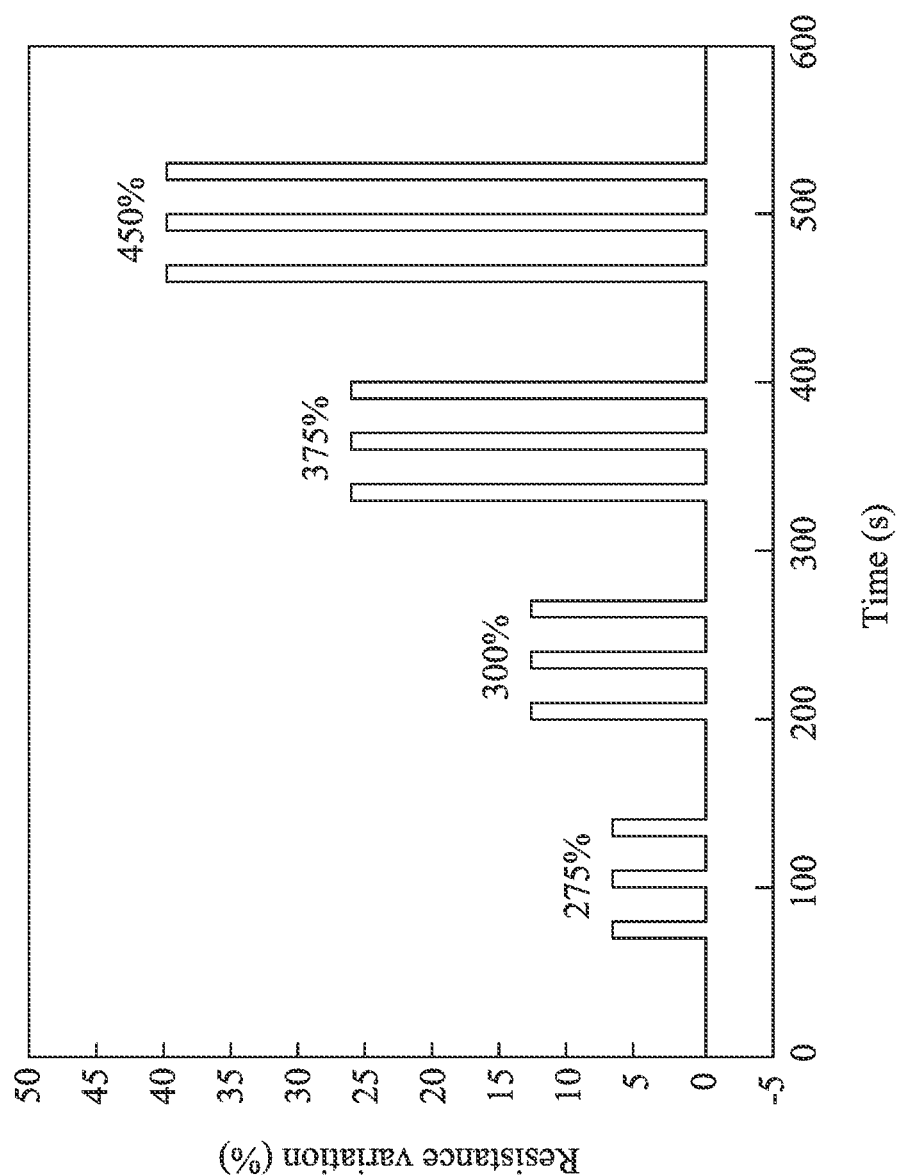
FIG. 4 is a diagram showing the relationship between a resistance variation and a number of times during a stretching/recovery period of the stretching portion of the stretch-deforming electrode in FIG. 2.

FIG. 4 is a diagram showing the relationship between a resistance variation and a number of times during a stretching/recovery period of the stretching portion 122S of the stretch-deforming electrode 122 in FIG. 2, in which the percentage 275%, 300%, 375%, and 450% shown in FIG. 4 refer to stretching length variations of the stretching portion 122S of the stretch-deforming electrode 122. As shown in FIG. 4, the stretching portion 122S of the stretch-deforming electrode 122 can still return to an original resistance of the stretching portion 122S well when being stretched to 275%, 300%, 375%, and 450% of an original length of the stretching portion 122S (i.e., the stretching length variations are 275%, 300%, 375%, and 450%). In detail, the stretching portion 122S of the stretch-deforming electrode 122 can still return to the original resistance of the stretching portion 122S well after being continuously stretched multiple times for 600 seconds while the stretching length variation of the stretching portion 122S gradually increases. On the other hand, the stretching portion 122S of the stretch-deforming electrode 122 has a stretching resistance recovery rate of between 95% and 100%. The stretching resistance recovery rate is defined as "a ratio of the resistance of the stretching portion 122S after the current stretching and recovery to the resistance of the stretching portion 122S after the previous stretching and recovery". In other words, the stretching portion 122S can almost completely return to a resistance of the stretching portion 122S before stretching after being stretched and then recovered. In some embodiments, under the premise that the stretching resistance recovery rate of the stretching portion 122S falls within the above-mentioned range, the stretching portion 122S may have a number of stretching recovery times of between 1 and 3000 times, and preferably, may have a number of stretching recovery times of between 500 and 1500 times. Based on the above, the stretch-deforming electrode 122 of the present disclosure may have good stretching resistance recovery, so as to be better applied to the biological sensing system 100, thereby ensuring the reusability of the biological sensing system 100 and prolonging the service life of the biological sensing system 100.

Reference is made back to FIG. 2. In some embodiments, the stretching portion 122S of the stretch-deforming electrode 122 may include a plurality of conductive structures, and the conductive structures may be, for example, conductive particle structures and/or conductive wire structures. In some embodiments, an average particle size of the conductive particle structures is between 0.5 nm and 100 μm. In some embodiments, an average wire diameter of the conductive wire structures is between 0.5 nm and 1 μm, and an average wire length of the conductive wire structures is between 50 nm and 1000 μm. By means of the size (e.g., the average particle size, the average wire diameter, and the average wire length) configuration of the conductive structures, the conductive structures can be densely distributed in the stretching portion 122S and contact each other to provide continuous current paths, thereby forming a conductive network, and when the stretching portion 122S is stretched and deformed under an external force, there is still a buffering gap between the conductive structures, so as to prevent the stretching portion 122S from local cracks or whole fracture. In some embodiments, the material of the conductive structures is at least one selected from of the group consisting of a single metal element (M1), binary metal (M1-M2), ternary metal (M1-M2-M3), single metal oxide (M1O$_x$), binary metal oxide (M1O$_x$-M2O$_x$), and a metal-metal oxide (M1-M1O$_x$) complex, in which 0<x<3, and M1, M2, and M3 are at least one selected from the group consisting of platinum, gold, palladium, silver, iridium, bismuth, lithium, iron, cobalt, nickel, copper, aluminum, chromium, titanium, manganese, antimony, zinc, zirconium, gallium, molybdenum, ruthenium, lawrencium, tin, indium, osmium, tantalum, tungsten, cerium, and yttrium. By means of the above-mentioned material selection of the conductive structures, the stretching portion 122S of the stretch-deforming electrode 122 may be provided with good electrical conductivity and stretching resistance recovery and thus have all the properties described in FIG. 3 and FIG. 4 above.

Figure 5:
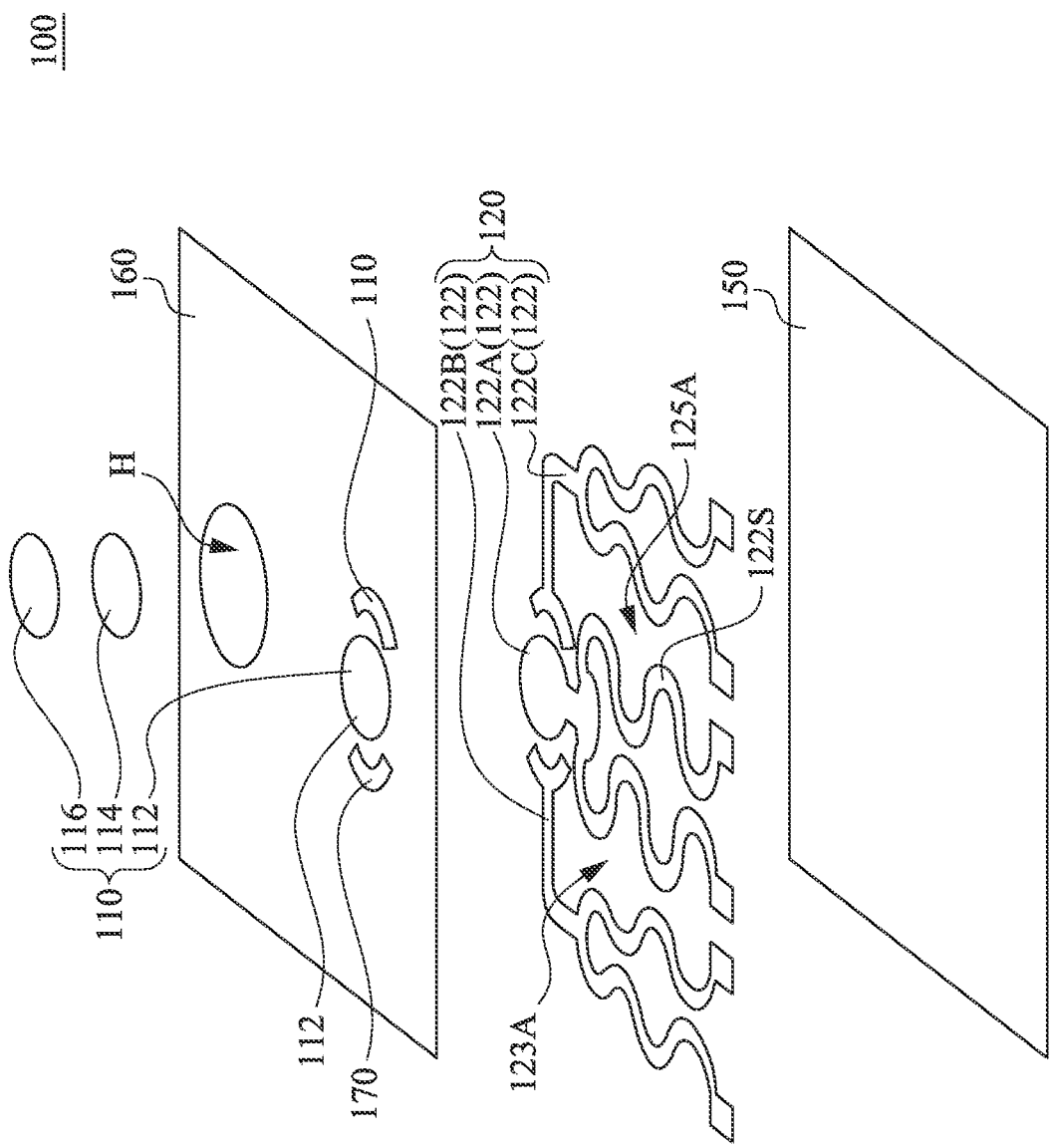
FIG. 5 is a schematic exploded view of the biological sensing system in FIG. 1, in which the controller and the corrector are omitted.

FIG. 5 is a schematic exploded view of the biological sensing system 100 in FIG. 1, in which the controller 130 and the corrector 140 are omitted. In more detail, FIG. 5 shows the biological sensing system 100 of the present disclosure in the form of a biological sensing patch. Reference is made to FIG. 1 and FIG. 5. In general, the biological sensing system 100 completes physiological sensing of the body of the user through the receiver 110, the transmitter 120, the controller 130, and the corrector 140. In the following description, the structural configurations of the receiver 110, the transmitter 120, the controller 130, and the corrector 140 and the operation modes of the receiver 110, the transmitter 120, the controller 130, and the corrector 140 during a physiological sensing period are sequentially described in detail with reference to the biological sensing systems 100 in FIG. 1 and FIG. 5.

In some embodiments, the receiver 110 includes a signal transmission layer 112, a signal enhancement layer 114, and a signal generation layer 116 stacked in sequence. In other words, the signal enhancement layer 114 is sandwiched between the signal transmission layer 112 and the signal generation layer 116. The signal generation layer 116 is configured to be in contact with a body of a user to receive a substance to be measured in the body of the user, thereby generating a signal value. In some embodiments, the signal generation layer 116 may include an oxidase (or enzyme) for reducing the activation energy required for the oxidation reaction of the substance to be measured, such that the substance to be measured is rapidly oxidized in the signal generation layer 116 to generate the signal value. That is, the signal value may be, for example, a signal value generated through a chemical reaction such as an oxidation reaction. In some embodiments, the signal value may be a current value. For example, when the substance to be measured is glucose, the oxidase in the signal generation layer 116 may be glucose oxidase, such that the glucose is oxidized to generate hydrogen peroxide ($H_2O_2$), and the generated hydrogen peroxide can further generate a current value for subsequent interpretation.

In some embodiments, the oxidase in the signal generation layer 116 is at least one selected from the group consisting of glucose oxidase, malate oxidase, hexose oxidase, cholesterol oxidase, aryl alcohol oxidase, L-gulonolactone oxidase, galactose oxidase, pyranose oxidase, L-sorbose oxidase, pyridoxine 4-oxidase, methanol oxidase, ecdysone oxidase, (S)-2-hydroxy-acid oxidase, choline oxidase, secondary alcohol oxidase, 4-hydroxymandelic acid oxidase, long-chain alcohol oxidase, glycerol-3-phosphate oxidase, vitamin B1 oxidase, zinc hydroxystannate oxidase, N-acylhexosamine oxidase, polyvinyl alcohol oxidase, lactone oxidase, vanillyl-alcohol oxidase, D-mannitol oxidase, nucleoside oxidase, xylitol oxidase, formate dehydrogenase, cellobiose dehydrogenase, acetaldehyde oxidase, pyruvate oxidase, oxalate oxidase, glyoxylate oxidase, arylaldehyde oxidase, pyruvate oxidase (CoA-acetylating), retinal oxidase, ketoglutarate dehydrogenase (succinyl conversion), ABA aldehyde oxidase, coproporphyrinogen oxidase, dihydroorotate oxidase, aryl-CoA oxidase, dihydrouracil oxidase, tetrahydroberberine oxidase, tryptophan α,β-oxidase, PQQ synthase, aryl-CoA dehydrogenase, dihydroorotate dehydrogenase, D-aspartate oxidase, L-galactonolactone oxidase, L-amino acid oxidase, D-amino acid oxidase, amino oxidase (containing flavonoids), pyridoxal 5'-phosphate synthase, amine oxidase (containing copper), D-glutamate oxidase, ethanolamine oxidase, putrescine oxidase, L-glutamate oxidase, cyclohexylamine oxidase, D-glutamate (D-aspartate) oxidase, protein-lysine 6-oxidase, L-lysine oxidase, L-aspartate oxidase, glycine oxidase, L-lysine 6-oxidase, amine dehydrogenase, FMN reductase, sarcosine oxidase, N-methyl-L-amino acid oxidase, N6-methyl-lysine oxidase, (S)-6-hydroxynicotine oxidase, (R)-6-hydroxynicotine oxidase, L-methylpiperidine, dimethylglycine oxidase, polyamine oxidase, DHBP oxidase, trimethylamine dehydrogenase, L-pipecolate dehydrogenase, cytokinin dehydrogenase, nitrite reductase, NAD(P)H oxidase, NAD(P)H dehydrogenase (terephthalotrione), nitroalkane oxidase, uric acid oxidase, 3-nitropropionic acid methyl ester oxidase, dihydrolipoic acid dehydrogenase, sulfite oxidase, thiol oxidase, glutathione oxidase, methylthiol oxidase, alkenyl cysteine oxidase, rapamycin-B oxidase, 3-hydroxyanthranilate oxidase, NADH peroxidase, 2-nitropropane dioxygenase, lactate 2-monooxygenase, lysine 2-monooxygenase, luciferin 4-monooxygenase (ATP hydrolysis), phenylalanine 2-monooxygenase, clavaminate synthase, sodium anthranilate 3-monooxygenase, xanthine dehydrogenase, phenylalanine 4-monooxygenase, naphtha 1,2-dioxygenase, alkanal monooxygenase, 4-ethyl amine benzoate 1-monooxygenase, monophenol monooxygenase, 7-cholestene oxidase, superoxide dismutase, superoxide reductase, xanthine oxidase, 6-hydroxynicotine dehydrogenase, lychee enzyme, and ribulose diphosphate carboxylase. Based on the above, the oxidase in the signal generation layer 116 can be selected according to different substances to be measured.

In some embodiments, the signal enhancement layer 114 is connected to the signal generation layer 116, and the signal enhancement layer 114 is configured to receive the signal value generated by the signal generation layer 116 and amplify the signal value to generate an enhanced signal value (also referred to as a first signal value). In other words, the first signal value is also a current value. In some embodiments, the signal enhancement layer 114 may include a plurality of conductive structures, and the conductive structures may be, for example, conductive particle structures and/or conductive wire structures. In some embodiments, an average particle size of the conductive particle structures is between 0.5 nm and 100 μm. In some embodiments, an average wire diameter of the conductive wire structures is between 0.5 nm and 1 μm, and an average wire length of the conductive wire structures is between 50 nm and 1000 μm. For the material of the conductive structures, reference may be made to the material of the conductive structures included in the stretching portion 122S, and details are not repeated hereinafter. By means of the above-mentioned configuration and material selection of the conductive structures, the signal enhancement layer 114 can better generate an enhanced first signal value.

In some embodiments, the signal transmission layer 116 is connected to the signal enhancement layer 114 and the working electrode layer 122A, and the signal transmission layer 116 is sandwiched between the signal enhancement layer 114 and the working electrode layer 122A in order to receive the first signal value from the signal enhancement layer 114 and transmit the first signal value to the working electrode layer 122A. In some embodiments, an oxidation potential of the signal transmission layer 116 is higher than an oxidation potential of the signal enhancement layer 114 (i.e., the signal transmission layer 116 is relatively less likely to be oxidized) to ensure that the signal transmission layer 116 does not undergo an electrochemical reaction such as an oxidation reaction, thereby preventing the signal transmission layer 116 from generating unnecessary signal values and causing inaccuracy of physiological sensing. In some embodiments, the signal transmission layer 116 may include a plurality of conductive structures, and the material of the conductive structures is at least one selected from the group consisting of platinum, gold, bismuth, palladium, silver, iridium, iron, carbon nanotubes, conductive carbon black, graphite, glassy carbon, nickel, cobalt, copper, osmium, tantalum, and tungsten. By means of the above-mentioned material selection of the conductive structures, the signal transmission layer 116 can be ensured to be provided with good electrical conductivity without causing the inaccuracy of physiological sensing due to the generation of unnecessary signal values.

In some embodiments, the transmitter 120 may include a working electrode layer 122A, a counter electrode layer (also referred to as an auxiliary electrode layer) 122B, and a reference electrode layer 122C. In some embodiments, the working electrode layer 122A has a first side 123A and a second side 125A facing away from the first side 123A, and the counter electrode layer 122B and the reference electrode layer 122C are respectively disposed on the first side 123A and the second side 125A of the working electrode layer 122A. Based on the above, the working electrode layer 122A, the counter electrode layer 122B, and the reference electrode layer 122C together constitute a three-electrode system of the transmitter 120. As described above, the working electrode layer 122A may include the above-mentioned stretch-deforming electrode 122. In some embodiments, the working electrode layer 122A is configured to receive the first signal value from the signal transmission layer 116, generate a second signal value, and transmit the first signal value and the second signal value to the controller 130. In some embodiments, the second signal value may be a resistance value of the stretch-deforming electrode 122 in a current deformation state. In some embodiments, the counter electrode layer 122B and the reference electrode layer 122C may also include the above-mentioned stretch-deforming electrode 122, and the respective stretch-deforming electrodes 122 of the working electrode layer 122A, the counter electrode layer 122B, and the reference electrode layer 122C can extend along the same direction (i.e., the respective long axes of the stretch-deforming electrodes 122 of the working electrode layer 122A, the counter electrode layer 122B, and the reference electrode layer 122C extend along the same direction), to improve the accuracy of measurement, thereby avoiding the inaccuracy of physiological sensing. In some embodiments, the material of the conductive structures included in the stretch-deforming electrode 122 of the reference electrode layer 122C is at least one selected from the group consisting of silver, silver chloride, iridium oxide, ruthenium oxide, platinum oxide, palladium oxide, tin oxide, tantalum oxide, rhodium oxide, mercury, mercuric chloride, osmium oxide, titanium oxide, mercury oxide, and antimony oxide.

Reference is made to FIG. 1, FIG. 3, and FIG. 5. In some embodiments, the controller 130 is electrically connected to the working electrode layer 122A, the counter electrode layer 122B, and the reference electrode layer 122C of the transmitter 120, and the controller 130 is configured to receive the first signal value and the second signal value from the working electrode layer 122A and determine, through the received second signal value, whether the first signal value needs to be corrected. Specifically, taking the first signal value as a current value and the second signal value as a resistance value as an example, the controller 130 can calculate the current resistance variation of the stretching portion 122S through the received resistance value and determine whether the resistance variation falls within the second stretching range A2 of the stretching portion 122S, so as to further determine whether the received current value needs to be corrected. In detail, when it is determined that the resistance variation falls within the second stretching range A2 of the stretching portion 122S, the controller 130 determines that the current value needs to be corrected; when it is determined that the resistance variation does not fall within the second stretching range A2 of the stretching portion 122S, the controller 130 determines that the current value does not need to be corrected.

In some embodiments, the corrector 140 is electrically connected to the controller 130, and the corrector 140 is configured to receive an instruction from the controller 130 to perform or not perform a correction function. Specifically, when the controller 130 determines that the current value needs to be corrected, the corrector 140 is configured to correct the current value and transmit the corrected current value to the controller 130, such that the controller 130 calculates the parameter to be measured of the substance to be measured through the corrected current value; when the controller 130 determines that the current value does not need to be corrected, the corrector 140 does not perform the correction function, and the controller 130 directly calculates the parameter to be measured of the substance to be measured through the current value received from the working electrode layer 122A.

Figure 6:
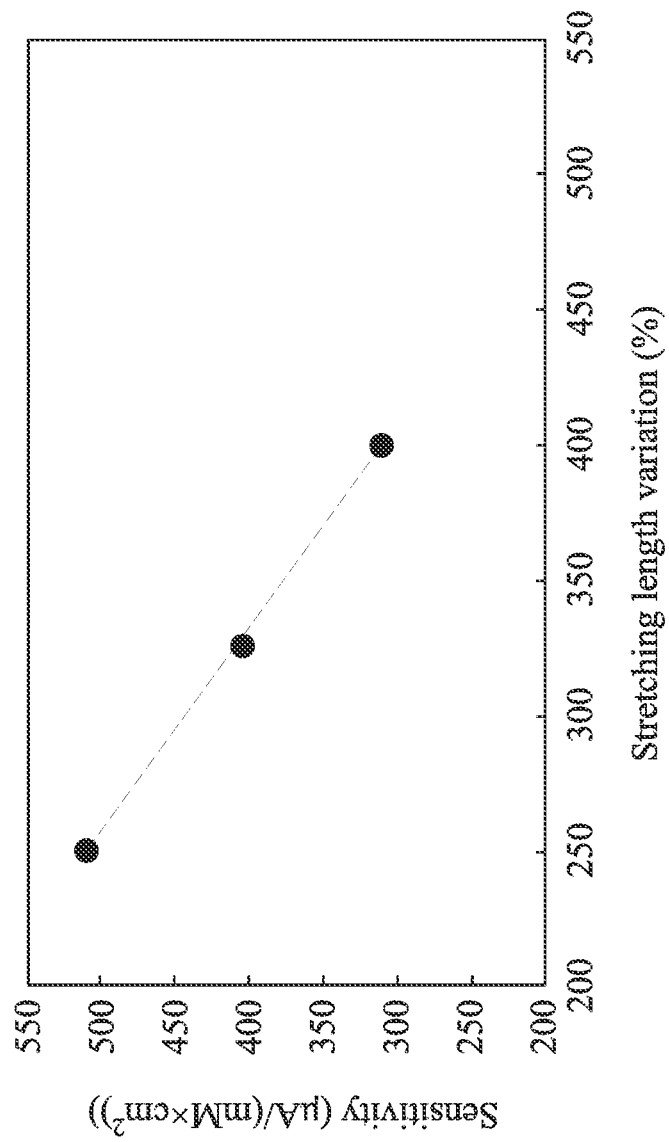
FIG. 6 is a diagram showing the relationship between a sensitivity of a biological sensing system and a stretching length variation of a stretching portion according to some embodiments of the present disclosure.
Figure 7:
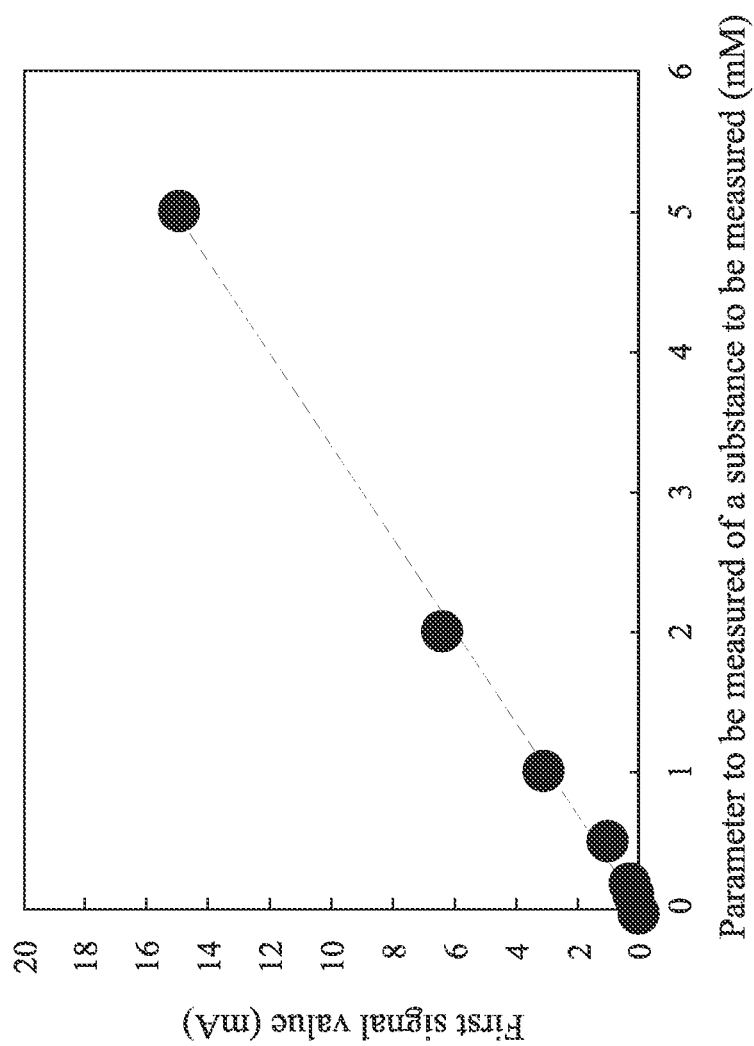
FIG. 7 is a diagram showing the relationship between a first signal value of a biological sensing system and a parameter to be measured of a substance to be measured according to some embodiments of the present disclosure.

Reference is made to FIG. 3, FIG. 5, FIG. 6, and FIG. 7 for specific correction details. FIG. 6 is a diagram showing the relationship between a sensitivity of a biological sensing system 100 and a stretching length variation of a stretching portion 122S according to some embodiments of the present disclosure, and FIG. 7 is a diagram showing the relationship between a first signal value (an enhanced signal value) of a biological sensing system 100 and a parameter to be measured of a substance to be measured according to some embodiments of the present disclosure. When the controller 130 determines that the current value needs to be corrected, the corrector 140 can firstly correspond the resistance variation of the stretching portion 122S that is received by the controller 130 to the stretching length variation of the stretching portion 122S at the moment when the resistance variation is generated according to the relationship shown in FIG. 3. Next, the corrector 140 can correspond the obtained stretching length variation to the sensitivity of the stretching portion 122S at the moment when the stretching portion 122S has the stretching length variation according to the relationship shown in FIG. 6, in which the sensitivity is defined as "formula: first signal value/(parameter to be measured of substance to be measured×area of the stretching portion 122S)". That is, the sensitivity is directly proportional to the slope of the curve in FIG. 7. Subsequently, the corrector 140 can correspond the obtained sensitivity to the first signal value generated by the substance to be measured (note: the first signal value generated by the substance to be measured is a signal value obtained after the signal value actually generated by the substance to be to be measured is enhanced by the signal enhancement layer 114) according to the relationship shown in FIG. 7. By means of the above-mentioned correction steps, the corrector 140 can obtain the signal value actually generated by the substance to be measured and further calculate the parameter to be measured of the substance to be measured in the body of the user.

Reference is made back to FIG. 5. In some embodiments, the biological sensing system 100 may further include a substrate 150 configured to carry the receiver 110 and the transmitter 120. The substrate 150 may be, for example, an insulating substrate, and the material of the substrate 150 is at least one selected from the group consisting of polyurethane, polydimethylsiloxane, polyimide, polystyrene sulfonic acid, a styrene-butadiene-styrene block copolymer, poly-3,4-ethylenedioxythiophene, and polybutylene adipate terephthalate. The above-mentioned material selection of the substrate 150 can ensure that the substrate 150 has good stretching recovery so as to be well applied to the wearable biological sensing system 100.

In some embodiments, the biological sensing system 100 may further include a waterproof layer 160, and the waterproof layer 160 is disposed on a surface of the transmitter 120 facing away from the substrate 150. In other words, the working electrode layer 122A, the counter electrode layer 122B, and the reference electrode layer 122C in the transmitter 120 jointly have a first surface and a second surface facing away from the first surface, and the substrate 150 and the waterproof layer 160 are respectively disposed on the first surface and the second surface, such that the transmitter 120 is sandwiched between the substrate 150 and the waterproof layer 160. Based on the above, the substrate 150 and the waterproof layer 160 can jointly protect the transmitter 120 to avoid damage to the transmitter 120 caused by external factors (e.g., moisture), thereby ensuring the accuracy of physiological sensing. In some embodiments, the waterproof layer 160 has a through hole H, and the receiver 110 is exposed by the through hole H so as to contact the body of the user to receive the substance to be measured.

In some embodiments, the biological sensing system 100 may further include two protective layers 170 corresponding to the counter electrode layer 122B and the reference electrode layer 122C, respectively. In some embodiments, the protective layer 160 may include an insulating material, and the two protective layers 170 can respectively cover the counter electrode layer 122B and the reference electrode layer 122C to provide proper protection. In some embodiments, the two protective layers 170 can also be exposed by the through hole H of the waterproof layer 160, but these are not intended to limit the present disclosure.

The properties of the biological sensing system 100 of the present disclosure can be further defined by various electrical testing methods. Specifically, the electrical testing methods may include cyclic voltammetry, square wave voltammetry, differential pulse voltammetry, and chronoamperometry. In the following description, the properties of the biological sensing system 100 under the tests of the above-mentioned electrical testing methods are described sequentially through the description of FIG. 8 to FIG. 11B in combination with the stretch-deforming electrode 122 in the working electrode layer 122A of FIG. 2.

Figure 8:
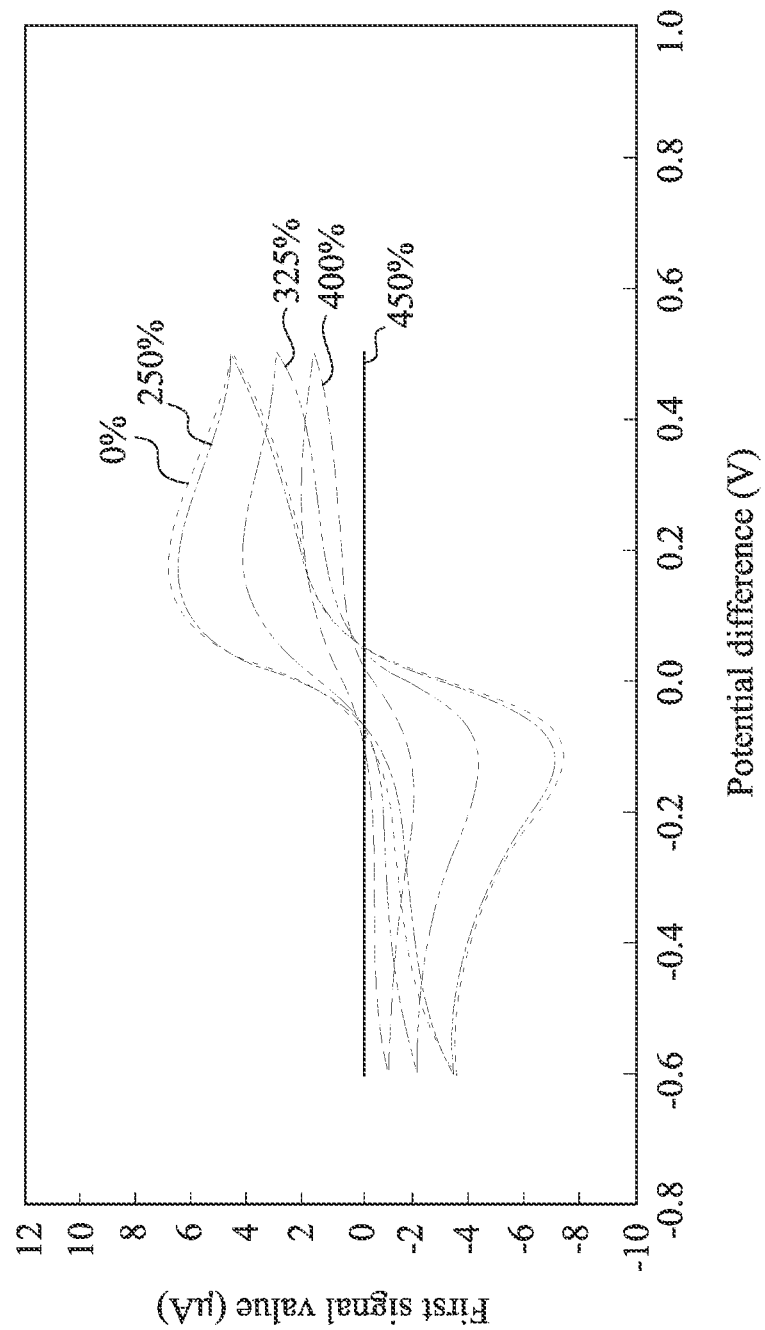
FIG. 8 shows a cyclic voltammogram of a stretching portion of a stretch-deforming electrode in a biological sensing system according to some embodiments of the present disclosure.

FIG. 8 shows a cyclic voltammogram of a stretching portion 122S of a stretch-deforming electrode 122 in a biological sensing system 100 according to some embodiments of the present disclosure. The percentages 0%, 250%, 325%, 400%, and 425% shown in FIG. 8 refer to stretching length variations of the stretching portion 122S of the stretch-deforming electrode 122. In some embodiments, when the substance to be measured is glucose and the parameter to be measured of the substance to be measured is the concentration of the glucose, and when the concentration of the glucose is between 0.005 mM and 1 mM (i.e., between 0.09 mg/dL and 18 mg/dL), the biological sensing system 100 can generate a first signal value (e.g., a current value), and when the first signal value passes through the stretch-deforming electrode 122 of the working electrode layer 122A, a cyclic voltammogram of the stretching portion 122S of the stretch-deforming electrode 122 can be obtained through cyclic voltammetry. Specifically, when the first signal value is between 0.0001 µA and 1000 µA (preferably between 0.0001 µA and 10 µA, and more preferably between 0.0001 µA and 8 µA), a stretching length variation of the stretching portion 122S of the stretch-deforming electrode 122 is less than 450%, a potential difference between two endpoints (i.e., a first endpoint P1 and a second endpoint P2) of the stretching portion 122S of the stretch-deforming electrode 122 is between −1 V and 1 V (preferably between −0.8 V and 0.8 V, and more preferably between −0.6 V and 0.6 V), and an area of the stretching portion 122S of the stretch-deforming electrode 122 in the cyclic voltammogram is between 0.00015 µA×V and 1500 µA×V. In detail, if the above-mentioned area is less than 0.00015 µA×V, it represents that the stretching length variation of the stretching portion 122S of the stretch-deforming electrode 122 exceeds a correctable range, resulting in signal distortion due to excessively low current; if the above-mentioned area is greater than 1500 µA×V, it represents that the stretching length variation of the stretching portion 122S of the stretch-deforming electrode 122 not only exceeds the correctable range but also leads to cracking of the electrode structure due to the excessive stretching length variation, resulting in signal distortion due to instantaneous excessive current. On the other hand, as the stretching length variation of the stretching portion 122S gradually increases, the area of the stretching portion 122S in the cyclic voltammogram gradually decreases. With reference to FIG. 3, in more detail, when the stretching length variation of the stretching portion 122S is in the non-correction area A1 (i.e., when the stretching portion 122S has the first length variation L1), the area of the stretching portion 122S in the cyclic voltammogram is between 350 µA×V and 1500 µA×V; when the stretching length variation of the stretching portion 122S is in the correction area A2 (i.e., when the stretching portion 122S has the second length variation L2), the area of the stretching portion 122S in the cyclic voltammogram is between 0.00015 µA×V and 349 µA×V. It should be particularly noted that, the cyclic voltammogram of FIG. 8 is only an exemplary example, which shows a result measured when the concentration of the glucose is 0.5 mM.

Figure 9A:
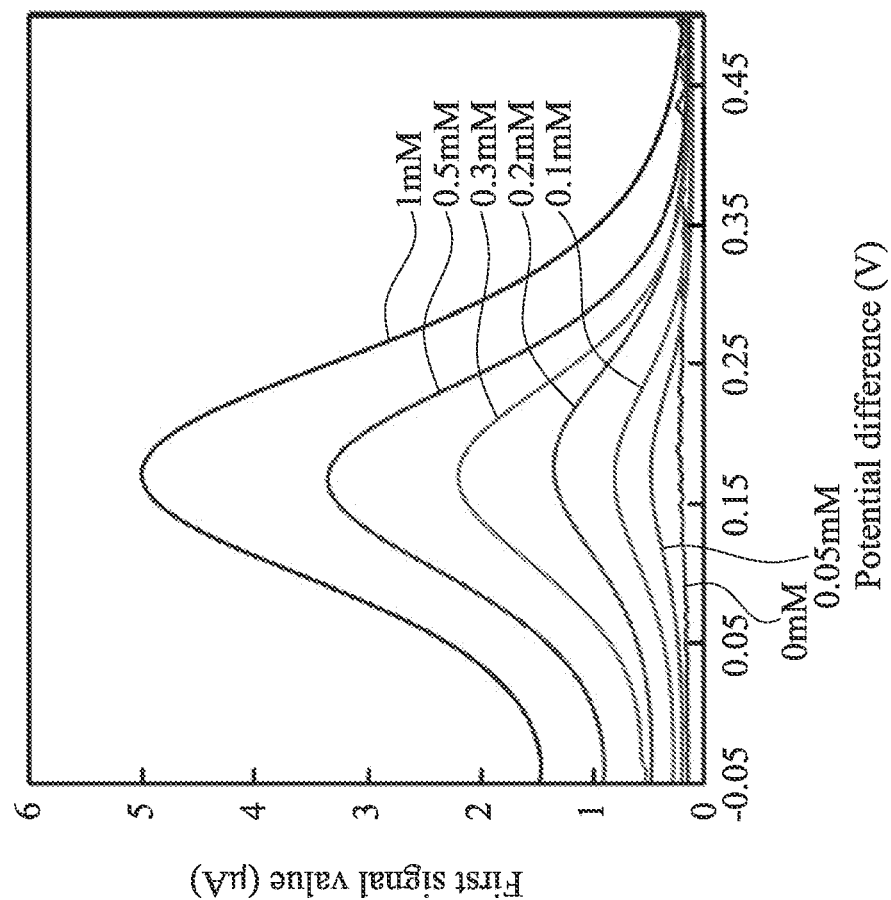
FIG. 9A shows a square wave voltammogram of a stretching portion of a stretch-deforming electrode in a biological sensing system according to some embodiments of the present disclosure.
Figure 9B:
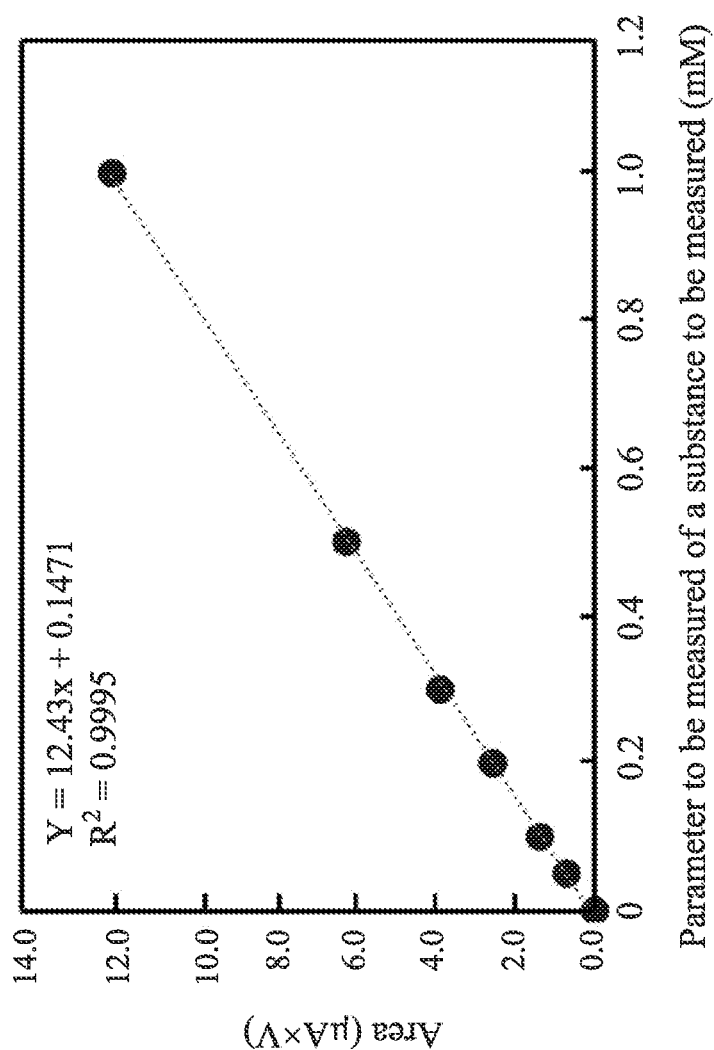
FIG. 9B specifically shows the test result of FIG. 9A through "the relationship between an area of the stretching portion presented in the square wave voltammogram and the parameter to be measured of the substance to be measured"

FIG. 9A shows a square wave voltammogram of a stretching portion 122S of a stretch-deforming electrode 122 in a biological sensing system 100 according to some embodiments of the present disclosure. The concentrations 0 mM, 0.05 mM, 0.1 mM, 0.2 mM, 0.3 mM, 0.5 mM, and 1 mM shown in FIG. 9A each refers to a parameter to be measured of a substance to be measured, and in this embodiment, to the concentration of glucose. In some embodiments, when the substance to be measured is glucose and the parameter to be measured of the substance to be measured is the concentration of the glucose, and when the concentration of the glucose is between 0.005 mM and 1 mM (i.e., between 0.09 mg/dL and 18 mg/dL), the biological sensing system 100 can generate a first signal value (e.g., a current value), and when the first signal value passes through the stretch-deforming electrode 122 of a working electrode layer 122A, a square wave voltammogram of the stretching portion 122S of the stretch-deforming electrode 122 can be obtained through square wave voltammetry. Specifically, when the first signal value is between 0.00015 µA and 835 µA (preferably between 0.00015 µA and 6 µA, and more preferably between 0.00015 µA and 5 µA), a stretching length variation of the stretching portion 122S of the stretch-deforming electrode 122 is less than 450%, a potential difference between two endpoints (i.e., a first endpoint P1 and a second endpoint P2) of the stretching portion 122S of the stretch-deforming electrode 122 is between −1 V and 1 V (preferably between −0.05 V and 0.50 V, and more preferably between −0.05 V and 0.45 V), and an area of the stretching portion 122S of the stretch-deforming electrode 122 in the square wave voltammogram is between 0.00015 µA×V and 1245 µA×V. In detail, if the above-mentioned area is less than 0.00015 µA×V, it represents that the stretching length variation of the stretching portion 122S of the stretch-deforming electrode 122 exceeds a correctable range, resulting in signal distortion due to excessively low current; if the above-mentioned area is greater than 1245 µA×V, it represents that the stretching length variation of the stretching portion 122S of the stretch-deforming electrode 122 not only exceeds the correctable range, but also leads to cracking of the electrode structure due to the excessive stretching length variation, resulting in signal distortion due to instantaneous excessive current. On the other hand, as the stretching length variation of the stretching portion 122S gradually increases, the area of the stretching portion 122S in the square wave voltammogram gradually decreases. With reference to FIG. 3, in more detail, when the stretching length variation of the stretching portion 122S is in the non-correction area A1 (i.e., when the stretching portion 122S has the first length variation L1), the area of the stretching portion 122S in the square wave voltammogram is between 250 µA×V and 1245 µA×V; and when the stretching length variation of the stretching portion 122S is in the correction area A2 (i.e., when the stretching portion 122S has the second length variation L2), the area of the stretching portion 122S in the square wave voltammogram is between 0.00015 µA×V and 249 µA×V. It should be particularly noted that, the square wave voltammogram of FIG. 9A is only an exemplary example, which shows a result measured when the stretching resistance variation of the stretching portion 122S is 5%. Moreover, for the sake of clarity, reference may further be made to FIG. 9B, which specifically shows the test result of FIG. 9A through "the relationship between the area of the stretching portion 122S presented in the square wave voltammogram and the parameter to be measured of the substance to be measured (i.e., the concentration of the glucose)".

Figure 10A:
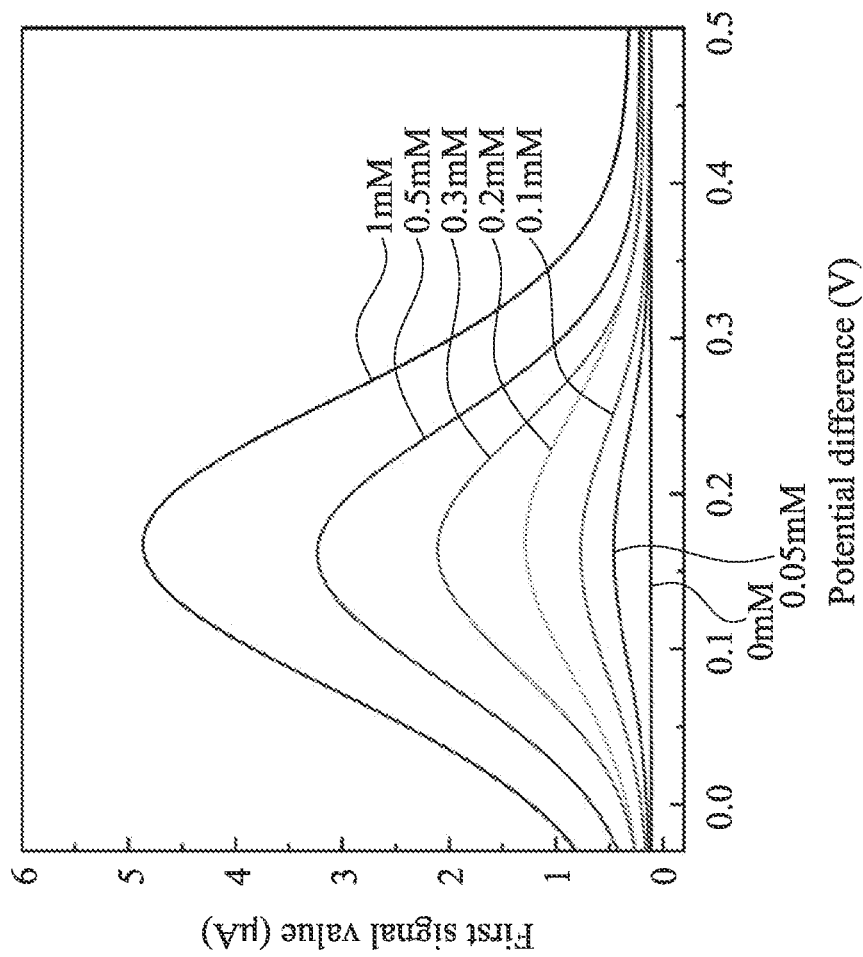
FIG. 10A shows a differential pulse voltammogram of a stretching portion of a stretch-deforming electrode in a biological sensing system according to some embodiments of the present disclosure.
Figure 10B:
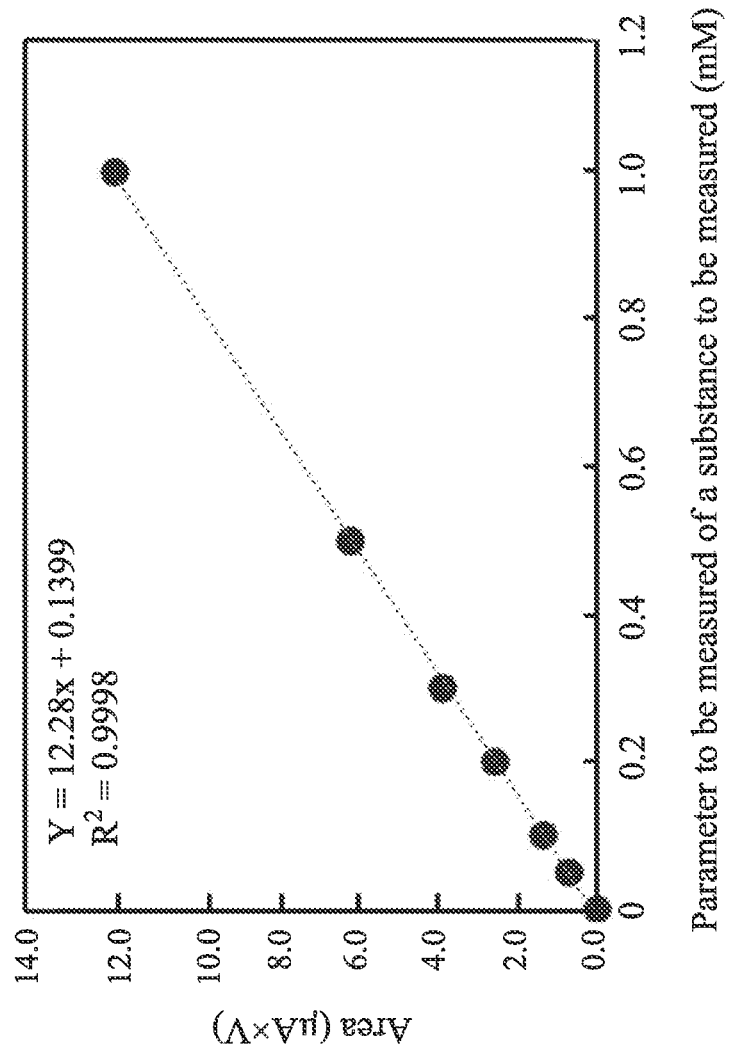
FIG. 10B specifically shows the test result of FIG. 10A through "the relationship between an area of the stretching portion presented in the differential pulse voltammogram and the parameter to be measured of the substance to be measured"

FIG. 10A shows a differential pulse voltammogram of a stretching portion 122S of a stretch-deforming electrode 122 in a biological sensing system 100 according to some embodiments of the present disclosure. The concentrations 0 mM, 0.05 mM, 0.1 mM, 0.2 mM, 0.3 mM, 0.5 mM, and 1 mM shown in FIG. 10A each refers to a parameter to be measured of a substance to be measured, and in this embodiment, to the concentration of glucose. In some embodiments, when the substance to be measured is glucose and the parameter to be measured of the substance to be measured is the concentration of the glucose, and when the concentration of the glucose is between 0.005 mM and 1 mM (i.e., between 0.09 mg/dL and 18 mg/dL), the biological sensing system 100 can generate a first signal value (e.g., a current value), and when the first signal value passes through the stretch-deforming electrode 122 of the working electrode layer 122A, a differential pulse voltammogram of the stretching portion 122S of the stretch-deforming electrode 122 can be obtained through differential pulse voltammetry. Specifically, when the first signal value is between 0.00015 µA and 795 µA (preferably between 0.00015 µA and 6 µA, and more preferably between 0.00015 µA and 5 µA), a stretching length variation of the stretching portion 122S of the stretch-deforming electrode 122 is less than 450%, a potential difference between two endpoints (i.e., a first endpoint P1 and a second endpoint P2) of the stretching portion 122S of the stretch-deforming electrode 122 is between −1 V and 1 V (preferably between −0.05 V and 0.50 V, and more preferably between −0.05 V and 0.45 V), and an area of the stretching portion 122S of the stretch-deforming electrode 122 in the square wave voltammogram is between 0.00015 µA×V and 1195 µA×V. For the description of the critical significance of the upper and lower limits of the above-mentioned area, reference may be made to the previous paragraphs, and details are not repeated hereinafter. On the other hand, as the stretching length variation of the stretching portion 122S gradually increases, the area of the stretching portion 122S in the differential pulse voltammogram gradually decreases. With reference to FIG. 3, in more detail, when the stretching length variation of the stretching portion 122S is in the non-correction area A1 (i.e., when the stretching portion 122S has the first length variation L1), the area of the stretching portion 122S in the differential pulse voltammogram is between 215 µA×V and 1195 pA×V; when the stretching length variation of the stretching portion 122S is in the correction area A2 (i.e., when the stretching portion 122S has the second length variation L2), the area of the stretching portion 122S in the differential pulse voltammogram is between 0.00015 µA×V and 214 µA×V. It should be particularly noted that, the differential pulse voltammogram of FIG. 10A is only an exemplary example, which shows a result measured when the stretching resistance variation of the stretching portion 122S is 5%. Moreover, for the sake of clarity, reference may further be made to FIG. 10B, which specifically shows the test result of FIG. 10A through "the relationship between the area of the stretching portion 122S presented in the differential pulse voltammogram and the parameter to be measured of the substance to be measured (i.e., the concentration of the glucose)".

Figure 11A:
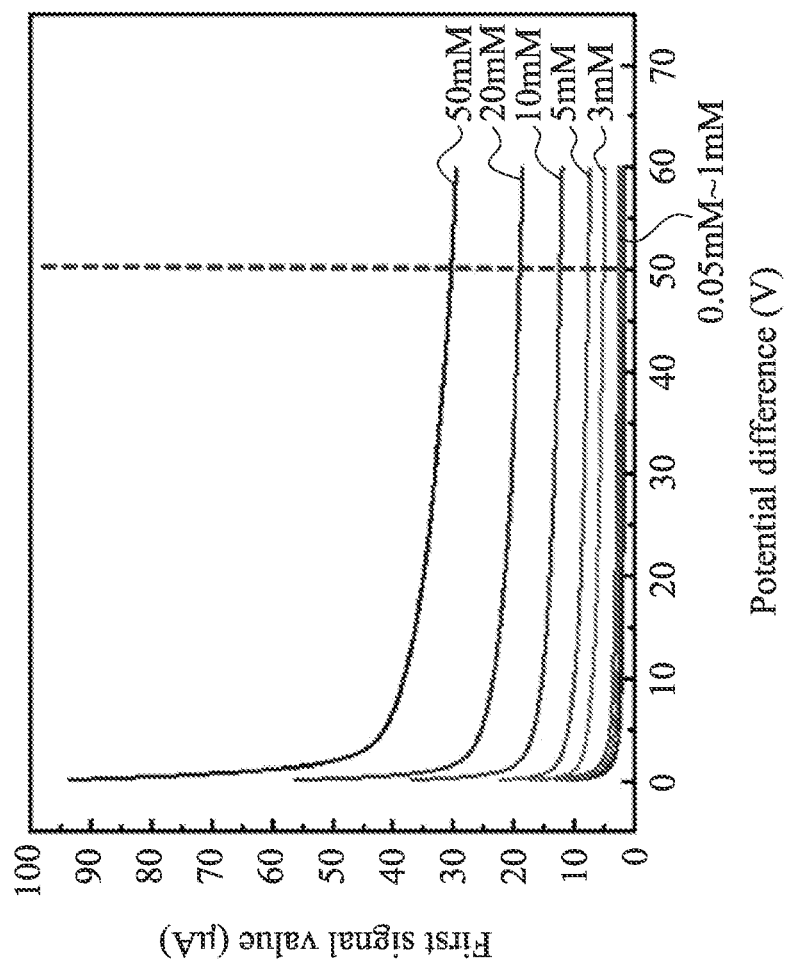
FIG. 11A shows a chronoamperometric graph of a stretching portion of a stretch-deforming electrode in a biological sensing system according to some embodiments of the present disclosure.
Figure 11B:
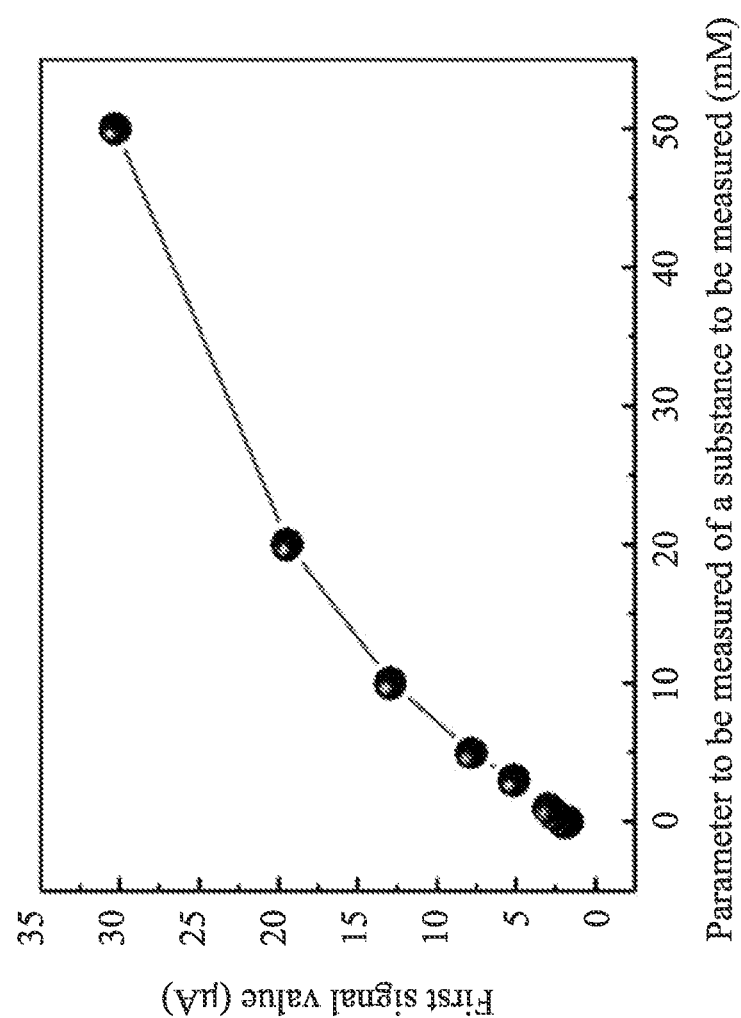
FIG. 11B specifically shows the test result of FIG. 11A through "the relationship between a first signal value of the stretching portion at the 50th second in the chronoamperometric graph and the parameter to be measured of the substance to be measured".

FIG. 11A shows a chronoamperometric graph of a stretching portion 122S of a stretch-deforming electrode 122 in a biological sensing system 100 according to some embodiments of the present disclosure. The concentrations 0.05 mM to 0.1 mM, 3 mM, 5 mM, 10 mM, 20 mM and 50 mM shown in FIG. 11A each refers to a parameter to be measured of a substance to be measured, and in this embodiment, to the concentration of glucose. In some embodiments, when the substance to be measured is glucose and the parameter to be measured of the substance to be measured is the concentration of the glucose, and when the concentration of the glucose is between 0.005 mM and 50 mM (i.e., between 0.09 mg/dL and 900 mg/dL), the biological sensing system 100 can generate a first signal value (e.g., a current value), and when the first signal value passes through the stretch-deforming electrode 122 of the working electrode layer 122A, a chronoamperometric graph of the stretching portion 122S of the stretch-deforming electrode 122 can be obtained through chronoamperometry. It should be particularly noted that, the chronoamperometric graph of FIG. 11A is only an exemplary example, which shows a result measured when the stretching resistance variation of the stretching portion 122S is 5%. As shown by the dotted line in FIG. 11A, when a driving voltage is applied to the biological sensor system 100 for 50 seconds, the measured current value is between 0.0001 µA and 35 µA. Moreover, for the sake of clarity, reference may further be made to FIG. 11B, which specifically shows the test result of FIG. 11A through "the relationship between the first signal value (i.e., the current value) of the stretching portion 122S at the 50th second in the chronoamperometric graph and the parameter to be measured of the substance to be measured (i.e., the concentration of the glucose)".

According to the aforementioned embodiments of the present disclosure, the stretch-deforming electrode of the present disclosure has the ability to withstand large stretching deformation and therefore can be well applied to a wearable biological sensing system, without local cracks or whole fracture resulting from limb movements of a user. In addition, when a stretching deformation amount (e.g., a length variation) of the stretch-deforming electrode exceeds a certain value, the resistance of the stretch-deforming electrode starts to change, resulting in a decrease in an output signal value. In this case, the biological sensing system can further perform the correction function through the corrector in the biological sensing system to calculate an actual signal value (e.g., a first signal value), and then calculate the parameter to be measured of the substance to be measured in the body of the user. In other words, by means of the combination of the stretch-deforming electrode and the corrector, the biological sensing system of the present disclosure can be applied more widely than conventional physiological sensing devices. On the other hand, the biological sensing system of the present disclosure can exhibit specific properties in various electrical testing diagrams under the testing of various electrical testing methods, and therefore can well achieve the function of physiological sensing.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A stretch-deforming electrode, comprising:
a stretching portion having a first stretching range and a second stretching range, wherein the stretching portion has a first length variation and a first resistance variation in the first stretching range and a second length variation and a second resistance variation in the second stretching range, the first resistance variation remains substantially unchanged when the first length variation changes, the second resistance variation changes when the second length variation changes, the second resistance variation is represented by R2, the second length variation is represented by L2, R2=A×L2, A is a positive number between 0.05 and 2, the first length variation is between 0% and 250%, and the second length variation is between 250% and 450%.

2. The stretch-deforming electrode according to claim 1, wherein a stretching resistance recovery rate of the stretching portion is between 95% and 100%.

3. The stretch-deforming electrode according to claim 2, wherein a number of stretching recovery times of the stretching portion is between 1 and 3000 times.

4. The stretch-deforming electrode according to claim 1, wherein a ratio of a range of the first length variation to a range of the second length variation is greater than or equal to 1.25.

5. The stretch-deforming electrode according to claim 1, wherein the stretching portion comprises a plurality of conductive particle structures, and an average particle size of the conductive particle structures is between 0.5 nm and 100 µm.

6. The stretch-deforming electrode according to claim 1, wherein the stretching portion comprises a plurality of conductive wire structures, an average wire diameter of the conductive wire structures is between 0.5 nm and 1 µm, and an average wire length of the conductive wire structures is between 50 nm and 1000 µm.

7. A biological sensing system, comprising:
a transmitter comprising a working electrode layer, wherein the working electrode layer comprises the stretch-deforming electrode according to claim 1;
a receiver electrically connected to the transmitter, wherein the receiver is configured to receive a substance to be measured and transmit a first signal value generated by the substance to be measured to the transmitter, such that the transmitter outputs the first signal value and a second signal value;
a controller electrically connected to the transmitter, wherein the controller is configured to receive the first signal value and the second signal value and determine whether the second signal value falls within the second stretching range of the stretching portion; and
a corrector electrically connected to the controller, wherein when the second signal value falls within the second stretching range of the stretching portion, the corrector is configured to correct the first signal value to calculate a parameter to be measured of the substance to be measured.

8. The biological sensing system according to claim 7, wherein the first signal value comprises a current value, and the second signal value comprises a resistance value.

9. The biological sensing system according to claim 7, wherein the receiver comprises:
a signal transmission layer connected to the working electrode layer and configured to transmit the first signal value to the working electrode layer;
a signal generation layer configured to receive the substance to be measured; and
a signal enhancement layer sandwiched between the signal transmission layer and the signal generation layer.

10. The biological sensing system according to claim 9, wherein an oxidation potential of the signal transmission layer is higher than an oxidation potential of the signal enhancement layer.

11. The biological sensing system according to claim 7, wherein the working electrode layer has a first surface and a second surface facing away from the first surface, and the biological sensing system further comprises:

a substrate disposed on the first surface of the working electrode layer; and a waterproof layer disposed on the second surface of the working electrode layer and having a through hole, wherein the receiver is exposed by the through hole.

12. The biological sensing system according to claim 7, wherein the working electrode layer has a first side and a second side facing away from the first side, and the transmitter further comprises:

a counter electrode layer disposed on the first side of the working electrode layer and comprising a second stretch-deforming electrode comprising a second stretching portion having a first stretching range and a second stretching range, wherein the second stretching portion has the first length variation and the first resistance variation in the first stretching range of the second stretching portion and the second length variation and the second resistance variation in the second stretching range of the second stretching portion; and a reference electrode layer disposed on the second side of the working electrode layer and comprising a third stretch-deforming electrode comprising a third stretching portion having a first stretching range and a second stretching range, wherein the third stretching portion has the first length variation and the first resistance variation in the first stretching range of the third stretching portion and the second length variation and the second resistance variation in the second stretching range of the third stretching portion.

13. A stretch-deforming electrode, comprising:

a stretching portion having a first stretching range and a second stretching range, wherein the stretching portion has a first length variation and a first resistance variation in the first stretching range and a second length variation and a second resistance variation in the second stretching range, the first resistance variation remains substantially unchanged when the first length variation changes, the second resistance variation changes when the second length variation changes, the second resistance variation is represented by R2, the second length variation is represented by L2, R2=A×L2, A is a positive number between 0.05 and 2, and a ratio of a range of the first length variation to a range of the second length variation is greater than or equal to 1.25.

14. The stretch-deforming electrode according to claim 13, wherein a stretching resistance recovery rate of the stretching portion is between 95% and 100%.

15. The stretch-deforming electrode according to claim 14, wherein a number of stretching recovery times of the stretching portion is between 1 and 3000 times.

16. The stretch-deforming electrode according to claim 13, wherein the stretching portion comprises a plurality of conductive wire structures, an average wire diameter of the conductive wire structures is between 0.5 nm and 1 µm, and an average wire length of the conductive wire structures is between 50 nm and 1000 µm.

17. A biological sensing system, comprising:

a transmitter comprising a working electrode layer, wherein the working electrode layer comprises the stretch-deforming electrode according to claim 13;

a receiver electrically connected to the transmitter, wherein the receiver is configured to receive a substance to be measured and transmit a first signal value generated by the substance to be measured to the transmitter, such that the transmitter outputs the first signal value and a second signal value;

a controller electrically connected to the transmitter, wherein the controller is configured to receive the first signal value and the second signal value and determine whether the second signal value falls within the second stretching range of the stretching portion; and a corrector electrically connected to the controller, wherein when the second signal value falls within the second stretching range of the stretching portion, the corrector is configured to correct the first signal value to calculate a parameter to be measured of the substance to be measured.

18. The biological sensing system according to claim 17, wherein the first signal value comprises a current value, and the second signal value comprises a resistance value.

19. A biological sensing system, comprising:

a transmitter comprising a working electrode layer, wherein the working electrode layer comprises a stretch-deforming electrode comprising a stretching portion having a first stretching range and a second stretching range, wherein the stretching portion has a first length variation and a first resistance variation in the first stretching range and a second length variation and a second resistance variation in the second stretching range, the first resistance variation remains substantially unchanged when the first length variation changes, the second resistance variation changes when the second length variation changes, the second resistance variation is represented by R2, the second length variation is represented by L2, R2=A×L2, and A is a positive number between 0.05 and 2;

a receiver electrically connected to the transmitter, wherein the receiver is configured to receive a substance to be measured and transmit a first signal value generated by the substance to be measured to the transmitter, such that the transmitter outputs the first signal value and a second signal value;

a controller electrically connected to the transmitter, wherein the controller is configured to receive the first signal value and the second signal value and determine whether the second signal value falls within the second stretching range of the stretching portion; and a corrector electrically connected to the controller, wherein when the second signal value falls within the second stretching range of the stretching portion, the corrector is configured to correct the first signal value to calculate a parameter to be measured of the substance to be measured.

20. The biological sensing system according to claim 19, wherein the first signal value comprises a current value, and the second signal value comprises a resistance value.

* * * * *